United States Patent
Nakahara et al.

(10) Patent No.: US 6,563,608 B1
(45) Date of Patent: May 13, 2003

(54) DOCUMENT READING APPARATUS AND LIGHT SOURCE ASSEMBLY THEREFOR

(75) Inventors: Kouji Nakahara, Tokyo (JP); Hiroya Ooki, Tokyo (JP); Tetsuichirou Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/323,038

(22) Filed: Jun. 1, 1999

(30) Foreign Application Priority Data

Jun. 1, 1998 (JP) .......................................... 10-167716

(51) Int. Cl.[7] .................................................. H04N 1/04
(52) U.S. Cl. ...................................................... 358/475
(58) Field of Search ................................ 358/475, 509, 358/484, 474, 497, 494, 496; 250/234–236

(56) References Cited

U.S. PATENT DOCUMENTS

| | | | |
|---|---|---|---|
| 4,996,606 A | * 2/1991 | Kawai | 358/475 |
| 5,251,072 A | * 10/1993 | Fukuoka | 358/475 |
| 5,585,937 A | * 12/1996 | Kokubo et al. | 358/451 |
| 5,959,746 A | * 9/1999 | Tsai | 358/475 |
| 5,966,221 A | * 10/1999 | Tellam et al. | 358/475 |
| 6,222,647 B1 | * 4/2001 | Tadenuma et al. | 358/475 |

FOREIGN PATENT DOCUMENTS

| | | |
|---|---|---|
| JP | 61247158 | 11/1986 |
| JP | 1-221975 | 9/1989 |
| JP | 4131837 | 5/1992 |
| JP | 4136835 | 5/1992 |
| JP | 464864 | 6/1992 |
| JP | 520464 | 3/1993 |
| JP | 698095 | 4/1994 |
| TW | 349722 | 1/1999 |

* cited by examiner

*Primary Examiner*—Cheukfan Lee
(74) *Attorney, Agent, or Firm*—Young & Thompson

(57) ABSTRACT

A document reading apparatus includes a light-source assembly which can provide the reduced number of parts and the effective use of light. The light-source assembly includes a plate and a holder. The plate has a reflective surface at one side thereof and a fixing surface at the other side thereof, wherein the plate is fixed at the fixing surface such that the reflective surface is placed in a predetermined direction. The holder is provided on the reflective surface of the one side of the plate. The holder holds and fixes the light source substantially parallel to the reflective surface.

5 Claims, 6 Drawing Sheets

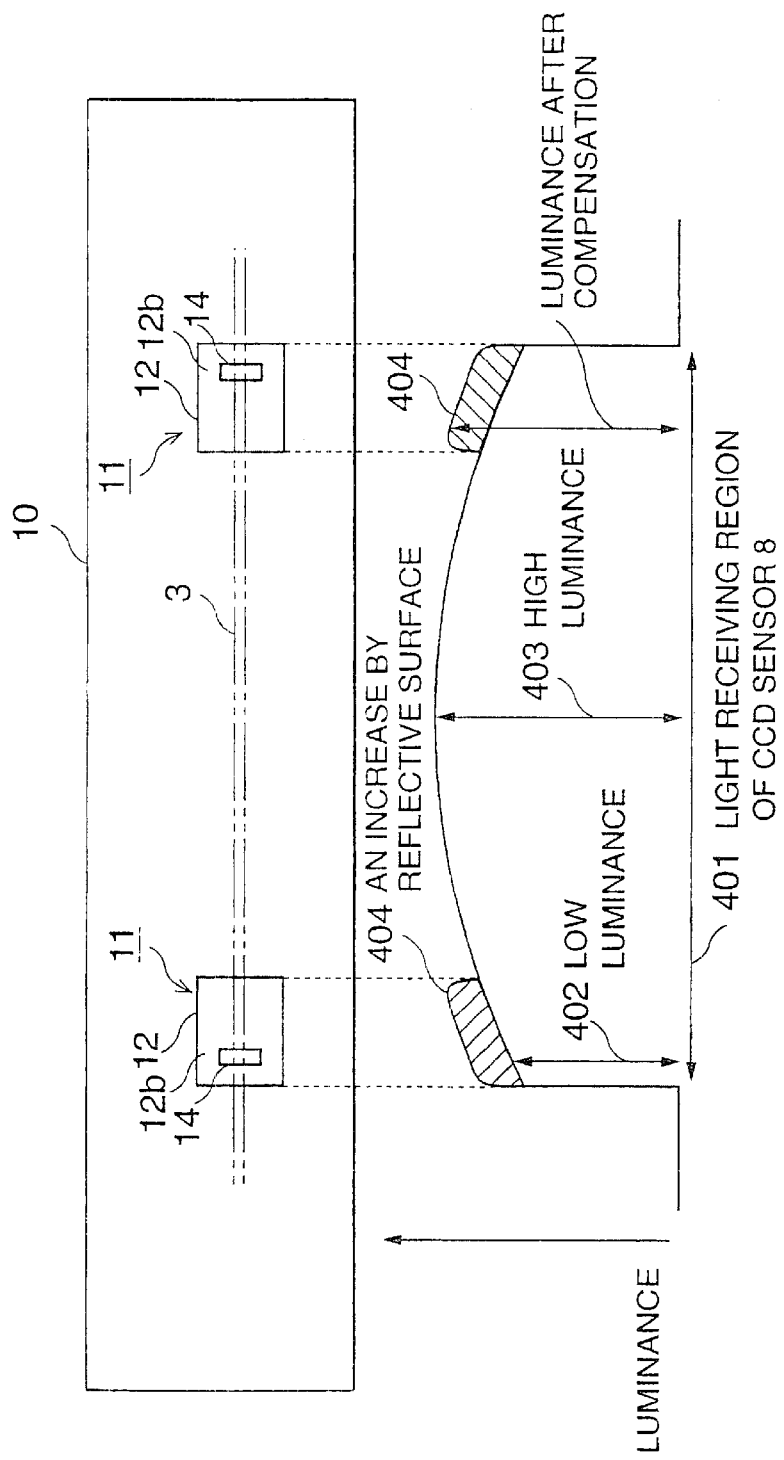

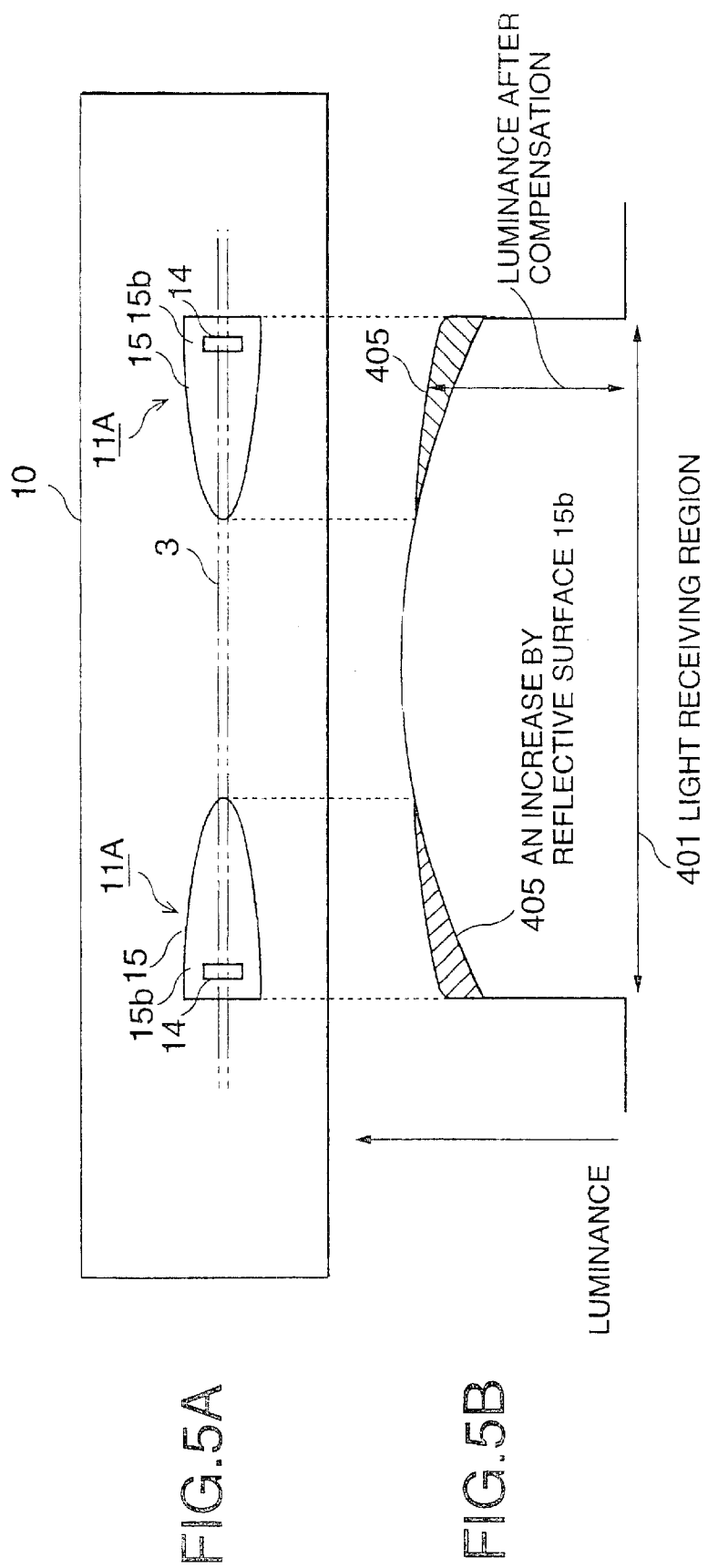

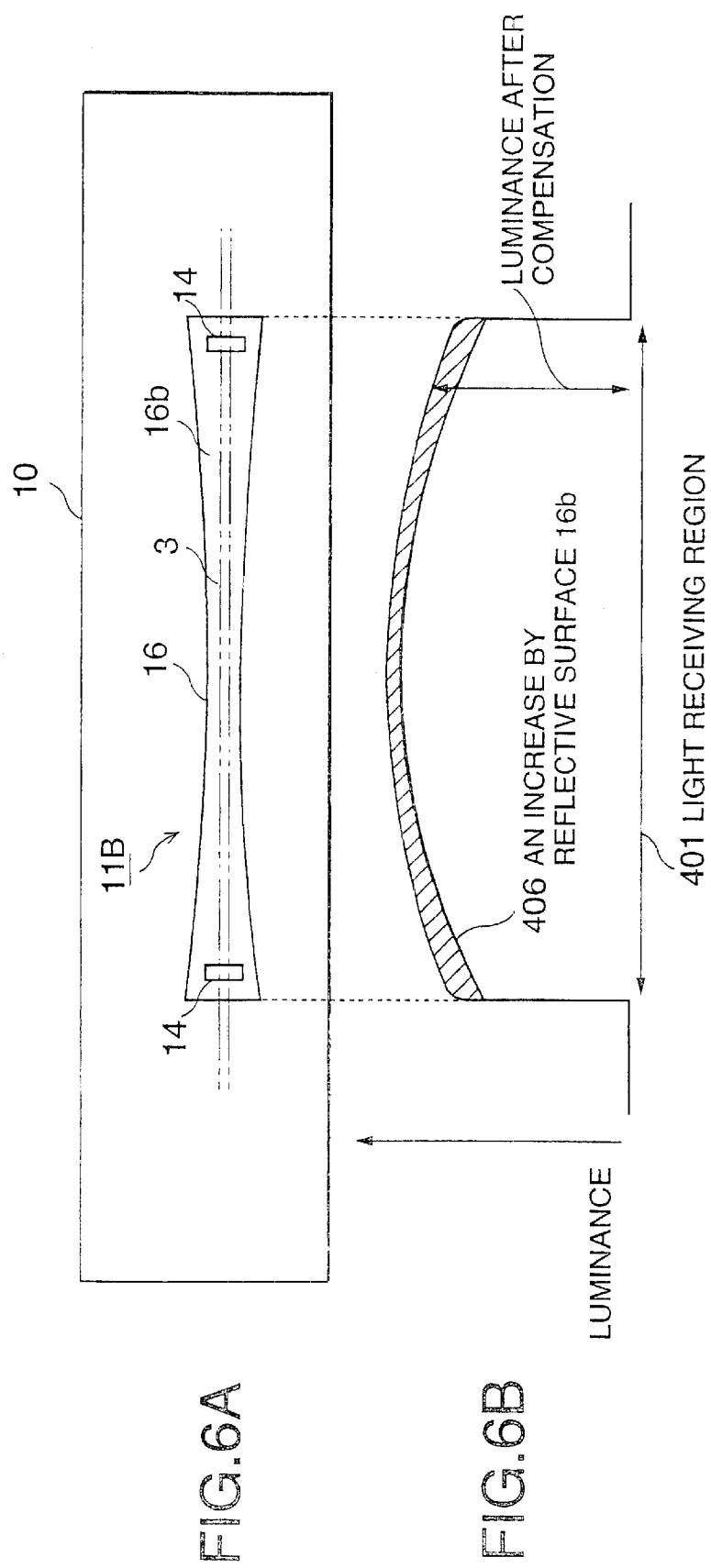

DOCUMENT READING APPARATUS AND LIGHT SOURCE ASSEMBLY THEREFOR

BACKGROUND OF THE INVENTION

1. Field of the Invention

The present invention relates to a document reading apparatus such as a scanner, and in particular to a document reading apparatus provided with a light source assembly for fixing a light source at a predetermined position.

2. Description of the Related Art

There has been utilized a document reading apparatus in which a light beam from a light source (lamp) is applied to a document and the light reflected by the document is detected by a photo sensor such as a CCD (charge-coupled device) image sensor. In the case where the light source for such a document reading apparatus is realized by one having a high luminance such as a mercury lamp, there can be obtained a sufficient quantity of light without taking any measures. However, when adopting one having a lower luminance such as a xenon tube, it is necessary to enhance the quantity of light to be applied to the document. There has been accordingly adopted such a measure that the light beam emitted from a lamp is reflected by a reflector or the like to enhance the quantity of light with which the document is illuminated.

In a conventional document reading apparatus, however, the reflector for reflecting the light emitted from the lamp is provided independently of a lamp fixing member for mount the lamp to a frame in the document reading apparatus. This causes the increased number of parts and the increased cost of the document reading apparatus and further it becomes difficult to simplify the work of assembling and maintenance of the document reading apparatus.

Another conventional light source assembly has been disclosed in Japanese Patent Application Laid-Open No. 1-221975 (229875/1989). This conventional light source assembly is provided with a lamp cover having an opening formed therein. The opening is designed to suppress the undesired illumination of the document.

Since the lamp cover shields the undesired light, however, the effective use of the light emitted from the light source cannot be achieved. In other words, such a conventional light source assembly requires one having a high luminance such as a mercury lamp.

SUMMARY OF THE INVENTION

It is therefore an object of the present invention to provide a light source assembly and a document reading apparatus which can achieve the reduced number of parts and the simplified work of assembling and maintenance of the document reading apparatus.

It is another object of the present invention to provide a light source assembly and a document reading apparatus which can achieve the effective use of light emitted from the light source with reliable information reading.

According to an aspect of the present invention, a light-source assembly fixes a light source which is used to illuminate a document, wherein light reflected from the document is received by an image sensor through an-image formation optical system. The light-source assembly includes a plate and a holder. The plate has a reflective surface at one side thereof and a fixing surface at the other side thereof, wherein the plate is fixed at the fixing surface such that the reflective surface is placed in a predetermined direction. The holder is provided on the reflective surface of the one side of the plate. The holder holds and fixes the light source substantially parallel to the reflective surface.

The plate may be formed in a shape changing in width so that a difference in luminance among light receiving positions in the Image sensor is reduced. The plate may be formed in a shape having its width progressively decreasing toward a center portion of the light source The holder may be composed of a snap-fitting member for holding and fixing the light source, and a supporting member fixed to the plate at one end thereof, for supporting the snap-fitting member at the other end thereof such that the light source is placed substantially parallel to the reflective surface. Preferably, the snap-fitting member has a hollow-cylindrical shape for holding the light source, wherein the snap-fitting member is made of elastic material Further, the plate may be formed in a rectangular shape. Alternatively, the plate may be formed in a shape having its width progressively decreasing toward a center portion of the light source.

Furthermore, the plate may be provided with a pair of holders provided on the reflective surface of the one side of the plate, wherein the holders hold and fix the light source substantially parallel to the reflective surface.

According to another aspect of the present invention, a document reading apparatus includes a light source for illuminating a document; a light-source assembly for fixing the light source; an Image sensor for sensing an optical image formed thereon; and an optical system for forming the optical image on the image sensor from light reflected from the document. The light-source assembly includes the plate and the holder as described above.

BRIEF DESCRIPTION OF THE DRAWINGS

FIG. 4A is a plan view of the light source assembly according to the first embodiment of the present invention;

FIG. 4B is a diagram showing a light distribution curve where a lamp is fixed by the light source assembly of FIG. 4A;

FIG. 5A is a plan view of the light source assembly according to a second embodiment of the present invention;

FIG. 5B is a diagram showing a light distribution curve where a lamp is fixed by the light source assembly of FIG. 5A;

FIG. 6A is a plan view of the light source assembly according to a third embodiment of the present invention; and FIG. 6B is a diagram showing a light distribution curve where a lamp is fixed by the light source assembly of FIG. 6A;

DETAILED DESCRIPTION OF THE PREFERRED EMBODIMENTS

First Embodiment

Figure 1:
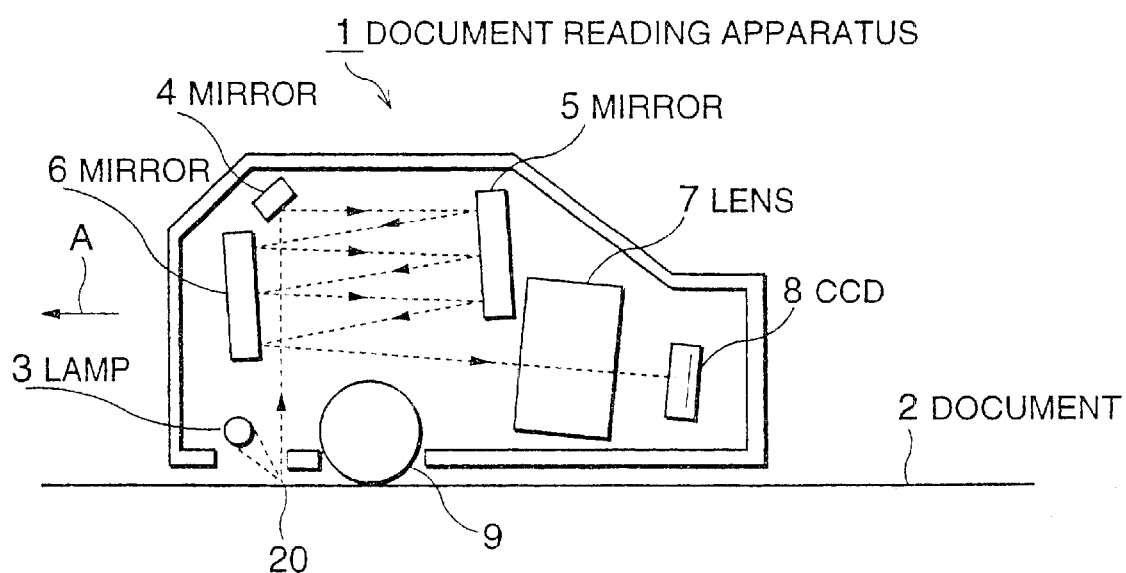
FIG. 1 is a sectional side view showing a whole constitution of a document reading apparatus according to the present invention.

Referring to FIG. 1, a document reading apparatus 1 according to the present invention reads image information on a document 2 by relatively moving it in a direction A. The apparatus has a cylindrical lamp (light source) 3 therein, wherein the lamp 3 illuminates a document reading position 2a of the document 2 in a linear shape with the light emitted from the lamp 3. The light emitted from the lamp 3 is reflected upwardly off the document reading position 2a of the document 2.

The apparatus further includes a mirror 4 for reflecting the reflected light from the document 2, and mirrors 5 and 6 for repeating reflection of the thus reflected light for several times to thereby send the light via lens 7 to a CCD image sensor 8. The CCD image sensor 8 reads out image information on the document 2 from the reflected light incoming from the lens 7. There is further provided a driving mechanism 9 for moving one of the document reading apparatus 1 and the document 2.

Figure 2A:
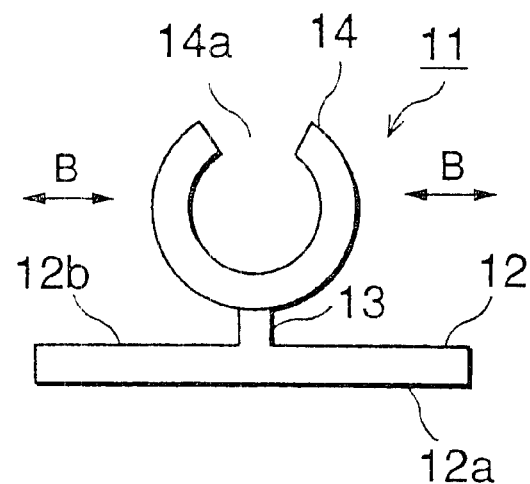
FIG. 2A is a front view of a light source holder in a light-source assembly according to a first embodiment of the present invention.
Figure 2B:
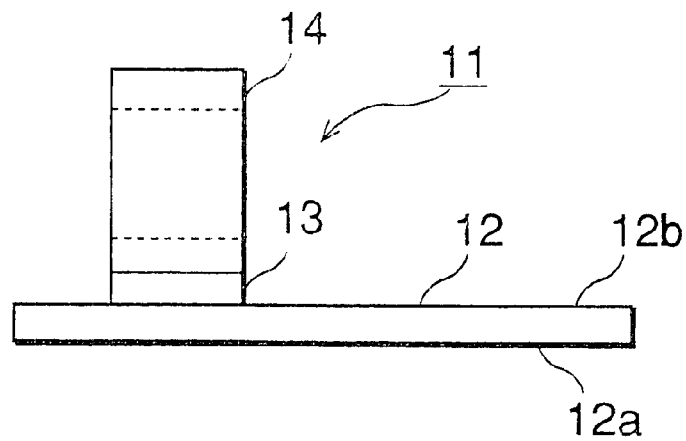
FIG. 2B is a side view showing the light source holder of FIG. 2A.

As shown in FIGS. 2A and 2B, a light source fixing assembly (holder) 11 is constituted by placing a ring portion 14 at an end portion of a supporting plate 13 projected from a flat plate 12. The ring portion 14 is shaped like a hollow cylinder having a cut-away portion 14a. The flat plate 12 has a mounting surface 12a at one side and a reflective surface 12b at the other side. This light source fixing assembly 11 is made of a resin material having elasticity. The supporting plate 13 and ring portion 14 (i.e., constituent elements of the light source fixing assembly 11 other than the flat plate 12) cooperatively constitute a snap-fitting part for holding the lamp 3.

Figure 3:
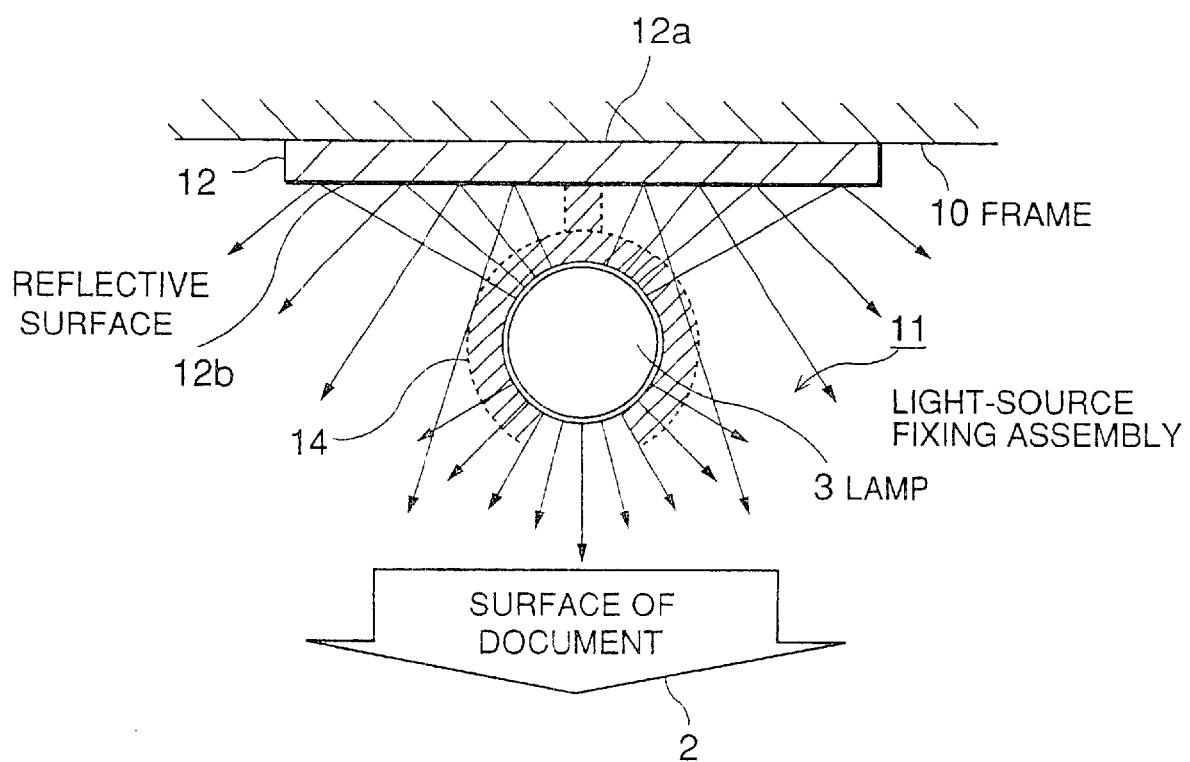
FIG. 3 is a side view showing the light source assembly for explanation of an operation of.the light source assembly.

The flat plate 12 is used to fix the light source fixing assembly 11 to an optical frame 10, and functions as a reflector for reflecting the light emitted from the lamp 3 (see FIG. 3). As described above, the flat plate 12 has the mounting surface 12a to be fixed to the optical frame 10 by a fixing means such as a both-side adhesive tape, an adhesive, or screws. The reflective surface 12b of the flat plate 12 functions as a ref lector for reflecting the light emitted from the lamp 3 toward the document surface side.

The supporting plate 13 of the snap-fitting part is projected substantially perpendicularly from the reflective surface 12b of the flat plate 12 so as to support the ring portion 14 formed at the end portion of the plate 13. The ring portion 14 of the snap-fitting part is formed into a hollow cylindrical shape to hold therein the lamp 3. The ring portion 14 is formed with the cut-away portion 14a at a side opposite to the flat plate 12 (i.e., at the side facing toward the document surface), and is made of a thin elastic material such as to be expandable and contractible (or open and closed) in a direction B shown in FIG. 2. Accordingly, upon pressing the lamp 3 in the direction from the document surface side toward the cut-away portion 14a of the ring portion 14, the ring portion 14 is expanded in the direction B to receive the lamp 3 within a contour of the ring portion 14, and then the ring portion 14 returns in the direction B to its original state so that the lamp 3 is held within the ring portion 14.

In this way, the lamp 3 for illuminating the document is held and fixed by the snap-fitting part, so that the lamp 3 can be readily attached and detached and the positioning can be easily achieved.

There will be explained hereinafter the operation of the light source fixing assembly.

As shown in FIG. 3, the lamp 3 fixed by the snap-fitting part which is further fixed to the frame 10 omnidirectionally (radially) irradiates the light beams from its periphery. Those light beams emitted toward directions opposite to the document surface will reach the reflective surface 12b of the flat plate 12 and will be reflected thereby toward the document surface side. Therefore, the document surface is illuminated with both the light reflected by the reflective surface 12b and the light emitted by the lamp 3 in the directions toward the document surface, resulting in a larger quantity of light reaching the CCD Image sensor 8 of the document reading apparatus 1. In other words, there can be adopted a lamp having a lower luminance such as xenon tube.

It might be envisaged that the reflective surface 12b of flat plate 12 according to the present embodiment be omitted and the light of interest be reflected by a surface of the optical frame 10 to thereby obtain an effect comparable to what is obtained by the present embodiment. However, the optical frame 10 is typically non-reflective (or absorbable) to light, so as to avoid such a situation that the light from the lamp 3 is reflected by an undesirable area directly toward the CCD image sensor 8 without involving the document. In this way, the surface of optical frame 10 is to be made to absorb the light from the lamp 3 so as not to affect other parts. Thus, there has been conventionally adopted a reflector for reflecting the light toward the document surface, when the quantity of light of lamp 3 is small. Further, the light source fixing member 11 of the present invention is constituted in a manner as shown in FIGS. 2A and 2B, thereby simultaneously achieving both functions of fixation of the light source and a role of a reflector.

Further, in the present invention, what reflects the light is only the reflective surface 12b of the rectangular flat plate 12, and those light beams arrived at the remaining parts are absorbed by the optical frame 10 as usual. Thus, by suitably adjusting the reflective surface size and shape of the flat plate 12 of light source fixing member 11, there can be readily conducted control of the reflecting direction and amount of light so as not to reflect the light from the reflective surface 12b in an unexpected direction.

In the document reading apparatus 1 adopting such a contracted optical system explained in FIG. 1, the light beams are converged by the lens 7, so that the quantities of light beams passing through the lens 7 decrease as the light beams get closer from the center portion of the primary scanning directional region toward each ends thereof. More specifically, when passing through the lens 7 which forms an optical image of the illuminated portion of the document 2 on the CCD sensor 8, the passing light is attenuated such that the magnitude of attenuation increases with distance from the center portion of the lens 7. As a result, the luminance of light received by the CCD image sensor 8 also becomes lower at each end portions of the light receiving region thereof than at the center portion thereof. Therefore, the lamp 3 is required to have a higher luminance at each end portions than at the center portion, in order to ensure a suitable quantity of light at each end portions of the light receiving region.

It is however difficult to partially change a luminance of the lamp 3 itself such as a fluorescent lamp. Thus, there has been conventionally adopted such as reflector or shading plate so as to equalize the luminance of light beams to be received by the CCD image sensor 8. It is preferable, in case of adopting a reflector, that the reflector is positioned and shaped so as to increase the luminance at each end portions of the light receiving region of the CCD sensor 8.

As shown in FIG. 4A, the near-end portions of the lamp 3 having a cylindrical shape are held by a pair of light source fixing assemblies 11 to fix the lamp 3. In this situation, the fixing positions of the lamp 3 overlaps with the desirable positions of the reflectors, so that the reflectors are suitably integrated with the light source fixing assembly 11 as shown in FIGS. 2A and 2B. In this way, the lamp 3 is fixed at the end portions by the light source fixing assemblies 11 according to the present invention and thereby a corrected luminance distribution is obtained as shown in FIG. 4B.

Referring to FIG. 4B, in the conventional case, the luminance at each end portions of the light receiving region 401 is lower than that at the center portion thereof as indicated by the reference numerals 402 and 403.

According to the first embodiment, the luminance at each end portions of the light receiving region 401 is increased by an increase 404 by the reflective surface 12b of flat plate 12, thereby approaching the higher luminance 403 at the center portion. Thus, the difference between the higher luminance portion 403 and the lower luminance portion 402 is reduced as a whole, thereby facilitating compensation of a signal to be outputted by the CCD image sensor 8.

According to the first embodiment described above, the reflectivity of the reflective surface 12b of flat plate 12 of light source fixing assembly 11 is increased, so that the light source fixing assembly 11 simultaneously achieves both functions of fixation of the lamp 3 and a role of a reflector. As a result, the number of parts of the document reading apparatus 1 is reduced and the work of assembling and maintenance of the apparatus can be simplified, as compared to such a situation that a light source fixing assembly and a reflector are separately provided.

Further, the near-end portions of the lamp 3 are fixed by the light source fixing assembly 11, so that the lamp 3 is stably fixed while increasing the luminance at each end portion of the light receiving region 401 of the CCD image sensor 8, resulting in that the luminance over the light receiving region 401 becomes more uniform, thereby facilitating compensation of the signal to be outputted by the CCD image sensor 8.

Second Embodiment

As shown in FIG. 5, a flat plate 15 of a light source fixing assembly 11A is formed to have its width progressively decreasing toward the center portion of the lamp 3 and this shape of the flat plate 15 is distinguished from the rectangular flat plate 12 of the first embodiment. Explanation of other constituent elements shall be omitted to avoid redundancy, since they are identical with those of the light source fixing assembly 11 of the first embodiment (see FIG. 2).

The flat plate 15 having its width progressively decreasing toward the center portion of the lamp 3 as shown in FIG. 5 causes the reflection quantity 405 of the reflective surface 15b of each flat plate 15 to become largest at the outer end thereof and to progressively decrease toward its inner end. Therefore, smoother transition of the luminance of light is allowed within the light receiving region of the CCD image sensor 8, resulting in facilitation of compensation of the signal to be outputted by the CCD image sensor 8.

Third Embodiment

According to the first and second embodiments, a pair of the light source fixing assemblies 11, 11A is separated. Alternatively, the pair of light source fixing assemblies can be integrated into a single piece in a third embodiment as shown in FIG. 6A.

As shown in FIG. 6A, a flat plate 16 of a light source fixing assembly 11B is formed to be integral from one end to the other and has its width smallest at its center portion and progressively increasing toward each end portions. Explanation of other constituent elements shall be omitted to avoid redundancy, since they are identical with those of the light source fixing assemblies 11 and 11A of the first and second embodiments.

The flat plate 16 of the light source fixing assembly 11B is formed to be integral from one end to the other of the lamp 3, thereby allowing reduction of the number of parts, and avoiding occurrence of misalignment between right and left members if the plate 16 were formed so.

As shown in FIG. 6B, since the flat plate 16 has width smallest at the center portion thereof and progressively increasing toward each end portions, smoother transition of the luminance of light can be obtained within the light receiving region 401 of the CCD Image sensor 8 as indicated by the reference numeral 406. Therefore, the incident light to the CCD sensor 8 can be easily corrected to obtain the output signal of the CCD images sensor 8 reflecting the image on the document 2 with reliability.

The snap-fitting part has been described as being formed of a resin material in the first through third embodiments, but it is possible to adopt a metal rather than the resin material. In this case, it is necessary to provide a structure capable of readily fixing the lamp 3. Further, since the light is totally reflected by a surface of metal, it is necessary to make the surface of flat plate so as to be angled and/or curved in view of the reflection direction.

According to the present invention as described above, the light source fixing assembly is constituted of a flat plate having one surface fixed to the frame and the other surface for reflecting the light from the cylindrical light source, and a snap-fitting part having a hollow cylindrical shape formed at the other side of the flat plate so as to hold the light source therein. Thus, it becomes possible, by the light source fixing assembly, to simultaneously achieve both functions of fixation of the light source and a role of a reflector, resulting in that the parts cost can be reduced as compared to such a case that a light source fixing assembly and a reflector are separately provided.

Further, the document reading apparatus according to the present invention is constituted such that each end portions of the light source are fixed by a light source fixing assembly constituted of a flat plate having one surface fixed to the frame within the apparatus and the other surface for reflecting the light from the light source, and a snap-fitting part having a hollow cylindrical shape formed at the other side of the flat plate so as to hold the light source therein. Thus, it becomes possible to reduce the number of parts and to simplify the work of assembling and maintenance of the document reading apparatus. Further, it becomes possible to enhance the quantity of light at each end portions of the light receiving region of the image sensor, thereby substantially equalizing the quantity of light within the light receiving region, to thereby exhibit such an effect that the light incident to the image sensor can be readily compensated.

In case that each of the flat plates of the light source fixing assembly are formed to have a width progressively decreasing toward the center portion of the light source, the reflected quantity of light is largest at the outer end portion side of the light source and can be progressively decreased toward the center portion side, thereby further smoothening the compensated quantity of light within the light receiving region of the image sensor. This results in such an effect that the signal to be outputted by the light receiving part can be compensated more readily.

In case that the flat plate of the light source fixing assembly is integrally formed from its one end up to the other end and constituted to have its width smallest at the center portion and progressively increasing toward each end portions, it becomes possible to reduce the number of parts and avoid occurrence of misalignment between right and left members if the flat plate were formed so in addition, it becomes possible to further smoothen the luminance of light beams within the light receiving region of the image sensor, thereby exhibiting such an effect that the signal to be outputted by the light receiving part can be readily compensated.

Although what has been described is at present considered to be the preferred embodiments of the present invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

What is claimed is:

1. A light-source assembly for fixing a light source which is used to illuminate a document, wherein light reflected from the document is received by an image sensor text through an image formation optical system, comprising:

a plate having a reflective surface at one side thereof and a fixing surface at the other side thereof, wherein the plate is fixed at the fixing surface such that the reflective surface is placed in a predetermined direction; and a holder provided on the reflective surface of the one side of the plate, for holding and fixing the light source substantially parallel to the reflective surface, wherein the plate is formed in a shape changing in width so that a difference in luminance among light receiving positions in the image sensor, is reduced, wherein the plate is formed in a shape having its width progressively decreasing toward a center portion of the light source.

2. A light-source assembly for fixing a light source which is used to illuminate a document, wherein light reflected from the document is received by an image sensor through an image formation optical system, comprising:

a pair of plates each having a reflective surface at one side thereof and a fixing surface at the other side thereof, wherein each of the plates is fixed at the fixing surface such that the reflective surface is placed in a predetermined direction; and a pair of holders which are provided on reflective surfaces of the plates, respectively, for holding and fixing the light source substantially parallel to the reflective surfaces, wherein each of the plates is formed in a shape having its width progressively decreasing toward a center portion of the light source.

3. A light-source assembly for fixing a light source which is used to illuminate a document, wherein light reflected from the document is received by an image sensor through an image formation optical system, comprising:

a plate having a reflective surface at one side thereof and a fixing surface at the other side thereof, wherein the plate is fixed at the fixing surface such that the reflective surface is placed in a predetermined direction; and a holder provided on the reflective surface of the one side of the plate, for holding and fixing the light source substantially parallel to the reflective surface, wherein the holder comprises:

a snap-fitting member for holding and fixing the light source; and a supporting member fixed to the plate at one end thereof, for supporting the snap-fitting member at the other end thereof such that the light source is placed substantially parallel to the reflective surface, wherein the plate is formed in a shape having its width progressively decreasing toward a center portion of the light source.

4. A document reading apparatus comprising:

a light source for illuminating a document;

a light-source assembly for fixing the light source;

an image sensor for sensing an optical image formed thereon; and an optical system for forming the optical image on the image sensor from light reflected from the document, wherein the light-source assembly comprises:

a plate having a reflective surface at one side thereof and a fixing surface at the other side thereof, wherein the plate is fixed at the fixing surface such that the reflective surface is placed in a predetermined direction; and a holder provided on the reflective surface of the one side of the plate, for holding and fixing the light source substantially parallel to the reflective surface, wherein the plate of the light-source assembly is formed in a shape changing in width so that a difference in luminance among light receiving positions in the image sensor is reduced, wherein the plate is formed in a shape having its width progressively decreasing toward a center portion of the light source.

5. A document reading apparatus comprising:

a light source for illuminating a document;

a light-source assembly.for fixing the light source;

an image sensor for sensing an optical image formed thereon; and an optical system for forming the optical image on the image sensor from light reflected from the document, wherein the light-source assembly comprises:

a plate having a reflective surface at one side thereof and a fixing surface at the other side thereof, wherein the plate is fixed at the fixing surface such that the reflective surface go is placed in a predetermined direction; and a holder provided on the reflective surface of the one side of the plate, for holding and fixing the light source substantially parallel to the reflective surface, wherein the plate of the light-source assembly is formed in a shape changing in width so that a difference in luminance among light receiving positions in the image sensor is reduced, wherein the plate-is formed in a shape having its width progressively decreasing toward a center portion of the light source, and the plate is provided with a pair of holders provided on the reflective surface of the one side of the plate, wherein the holders hold and fix the light source substantially parallel to the reflective surface.

* * * * *